(No Model.)

S. DONKIN.
DEVICE FOR PLACING BELTS ON PULLEYS.

No. 490,546. Patented Jan. 24, 1893.

UNITED STATES PATENT OFFICE.

SAMUEL DONKIN, OF DURHAM, ENGLAND.

DEVICE FOR PLACING BELTS ON PULLEYS.

SPECIFICATION forming part of Letters Patent No. 490,546, dated January 24, 1893.

Application filed May 6, 1892. Serial No. 432,063. (No model.)

*To all whom it may concern:*

Be it known that I, SAMUEL DONKIN, a subject of the Queen of Great Britain and Ireland, and a resident of Durham, county of Durham, England, have invented an Improved Device for Placing Belts on Pulleys, Sheaves, or Fly-Wheels While in Motion, of which the following is a specification.

This invention has for its object to provide novel means for placing belts on pulleys, sheaves or fly wheels, and preventing the belt from accidentally passing on to the pulley sheave or fly wheel when said belt is disconnected therefrom.

To accomplish this object my invention involves the features of construction and the combination or arrangement of devices hereinafter described and claimed reference being made to the accompanying drawings, in which—

Figure 1:
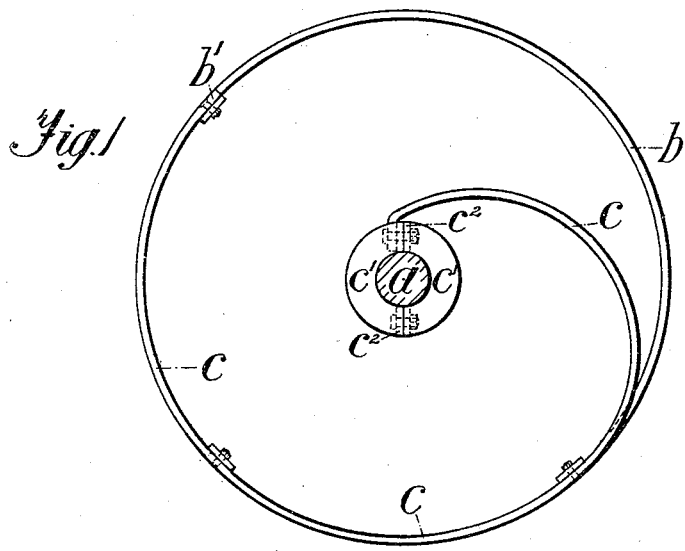
Figure 2:
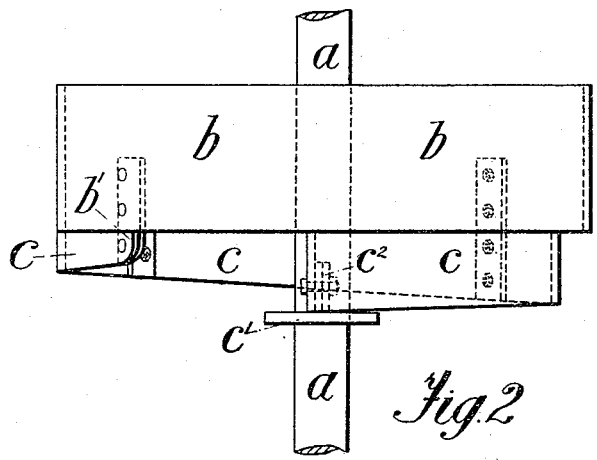

Figure 1, is a side elevation of a pulley or sheave provided with my invention, and Fig. 2, is a plan view of the same.

In the drawings A is a shaft or axle carrying a pulley, sheave or fly wheel $b$. In ordinary work this sheave will be fitted on a shaft opposite or corresponding to the loose pulley of a pair of fast and loose pulleys on another shaft.

C is a curved metal bar connecting the periphery of the sheave or disk $b$ with a point on or near its shaft periphery.

The bar C may be secured as shown in the drawings by having its inner end flanged over and bolted to the inside flanges $C^2$ of the collar C' which in turn is secured to the shaft as shown, while from the point where the bent bar meets the sheave periphery to its extremity at $b'$ it may be secured by straps and bolts, the latter having countersunk heads to avoid cutting or damaging the belt.

In practice when the belt is thrown off the sheave $b$ it is prevented from returning thereonto by the collar C' which is secured to the shaft or axle A, as before explained, in juxtaposition to the inner end of the curved bar C; but immediately it is required to refix the belt on the pulley or sheave for the purpose of transmitting power, I simply lift by means of a stick or equivalent appliance the slack of the belt over the collar C' onto the surface of the bar C as near the shaft as is convenient and as the sheave is revolving the belt is instantly carried up the bar or hoop and thence into its required position on the sheave. It will be observed that the bar C is made widest nearer the shaft whence it diminishes in width to its extremity as toward the latter portion the belt will travel partly on the sheave and partly on the bar.

In throwing a belt off a sheave, the belt is pushed over the curved bar C, so that said belt falls upon the shaft A, at a point outside of the collar C', which collar serves to prevent the belt from accidentally passing on to the curved bar C and thus engaging the pulley or sheave.

What I claim as my invention and desire to secure by Letters Patent is:

The combination with a shaft, a pulley or sheave thereon, and a curved bar connected at its inner end with the shaft and at its outer end with the peripheral portion of the pulley or sheave for placing a driving belt upon the latter, of a collar secured to the shaft in juxtaposition to the inner end of the curved bar for the purpose of preventing the accidental engagement of the belt with the pulley or sheave, substantially as described.

In testimony whereof I have signed my name to this specification in the presence of two subscribing witnesses.

SAMUEL DONKIN.

Witnesses:
R. H. SCOTT,
C. F. FORSTER.